(12) United States Patent
Otanez et al.

(10) Patent No.: US 11,872,989 B2
(45) Date of Patent: Jan. 16, 2024

(54) METHOD AND SYSTEM FOR CONTROLLING VEHICLE OPERATION

(71) Applicant: GM GLOBAL TECHNOLOGY OPERATIONS LLC, Detroit, MI (US)

(72) Inventors: Paul G. Otanez, Franklin, MI (US); Yiran Hu, Shelby Township, MI (US); Hualin Tan, Novi, MI (US); Daniel L Baibak, White Lake, MI (US); Ruixing Long, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 17/126,784

(22) Filed: Dec. 18, 2020

(65) Prior Publication Data

US 2022/0194377 A1 Jun. 23, 2022

(51) Int. Cl.
*B60W 30/182* (2020.01)
*B60W 10/04* (2006.01)
(Continued)

(52) U.S. Cl.
CPC .......... *B60W 30/182* (2013.01); *B60W 10/04* (2013.01); *B60W 10/18* (2013.01); *B60W 10/20* (2013.01); *B60W 30/12* (2013.01); *B60W 30/14* (2013.01); *B60W 40/08* (2013.01); *B60W 40/105* (2013.01); *B60W 40/109* (2013.01);
(Continued)

(58) Field of Classification Search
CPC ...... B60W 10/04; B60W 10/18; B60W 10/20; B60W 30/182; B60W 40/08; B60W 40/10; B60W 40/105; B60W 40/107; B60W 40/109; B60W 40/114; B60W 50/082; B60W 50/10; B60W 2520/10;
(Continued)

(56) References Cited

U.S. PATENT DOCUMENTS

| 2007/0185638 A1* | 8/2007 | Odenthal ............... B60W 40/11 701/70 |
| 2015/0100205 A1* | 4/2015 | Katsuyama ......... B60W 30/045 701/37 |
| 2016/0272197 A1* | 9/2016 | Hulten .................... B62D 6/003 |
| 2016/0288831 A1* | 10/2016 | Lee ........................... B62D 6/00 |

(Continued)

FOREIGN PATENT DOCUMENTS

DE 102005021819 A1 12/2005
DE 102008010494 A1 9/2008
(Continued)

*Primary Examiner* — Angela Y Ortiz
*Assistant Examiner* — Aaron K McCullers
(74) *Attorney, Agent, or Firm* — Quinn IP Law

(57) ABSTRACT

The concepts described herein relate to a calculation of desired future longitudinal horizons related to torque or acceleration, and desired future lateral horizons related to yaw rate and lateral velocity, and their use in response to driver-selectable modes. In the longitudinal direction, driver inputs of pedal and brake position as well as drivability metrics are used to calculate the desired future torque trajectory. In the lateral direction, the front and rear steering angles may be used with a bicycle model to derive the trajectories. The trajectories are used in a vehicle motion controller that uses weighting to tradeoff competing requests and deliver performance that is consistent with a selected driver mode, such as a tour mode, a sport mode, an off-road mode, a trailering mode, etc.

20 Claims, 6 Drawing Sheets

(51) Int. Cl.
  *B60W 50/08* (2020.01)
  *B60W 40/114* (2012.01)
  *B60W 40/109* (2012.01)
  *B60W 40/08* (2012.01)
  *B60W 10/18* (2012.01)
  *B60W 40/105* (2012.01)
  *B60W 10/20* (2006.01)
  *B60W 30/14* (2006.01)
  *B60W 30/12* (2020.01)

(52) U.S. Cl.
  CPC ........ *B60W 40/114* (2013.01); *B60W 50/082* (2013.01); *B60W 2520/10* (2013.01); *B60W 2540/10* (2013.01); *B60W 2540/12* (2013.01); *B60W 2540/18* (2013.01)

(58) Field of Classification Search
  CPC ....... B60W 2520/105; B60W 2540/10; B60W 2540/12; B60W 2710/0666; B60W 2710/083
  USPC ..................................................... 701/22, 23
  See application file for complete search history.

(56) References Cited

U.S. PATENT DOCUMENTS

| | | | |
|---|---|---|---|
| 2017/0137012 A1* | 5/2017 | Mao | B60W 10/08 |
| 2017/0305416 A1* | 10/2017 | Yamakado | B60T 7/12 |
| 2018/0297587 A1* | 10/2018 | Kasaiezadeh Mahabadi | B60W 50/00 |
| 2018/0297605 A1* | 10/2018 | Kasaiezadeh Mahabadi | B60W 40/10 |
| 2018/0297638 A1* | 10/2018 | Fujii | B60W 30/12 |
| 2018/0345973 A1* | 12/2018 | Krueger | B60T 13/588 |
| 2019/0064823 A1* | 2/2019 | Jiang | B60W 10/04 |
| 2019/0217854 A1* | 7/2019 | Park | B60W 30/045 |
| 2019/0337507 A1* | 11/2019 | Stein | B60W 50/0097 |
| 2020/0094797 A1* | 3/2020 | Shoji | B60W 40/076 |
| 2020/0307600 A1* | 10/2020 | Sato | B60W 10/20 |

FOREIGN PATENT DOCUMENTS

| | | |
|---|---|---|
| DE | 102008035115 | 4/2009 |
| DE | 102014219899 A1 | 4/2015 |
| DE | 102016215046 A1 | 2/2018 |
| DE | 102018207807 A1 | 11/2019 |
| EP | 2911907 B1 | 10/2013 |

* cited by examiner

METHOD AND SYSTEM FOR CONTROLLING VEHICLE OPERATION

INTRODUCTION

Vehicles are composed of components, sensors, subsystems, systems, controllers, and associated control routines that may advantageously operate to provide vehicle propulsion, braking, steering, suspension, etc., in response to operator and other input commands. The input commands may include commands related to vehicle acceleration and commands related to vehicle steering and lateral acceleration, which may conflict under certain operating conditions. By way of example, there may be conflicting priorities when there is a commanded change in longitudinal acceleration during a vehicle turning maneuver, which may affect vehicle handling and driver perceptions, depending upon a driver-selected mode of operation. When a driver-selected mode of operation is a sport mode, or another more aggressive mode of operation, there may be an expectation that the vehicle operation should give priority to the longitudinal acceleration. However, when the driver-selected mode of operation is a tour mode, or another more relaxed mode of operation, there may be an expectation that the vehicle operation should give priority to steering control to minimize yaw and lateral acceleration.

As such, there may be a need for components, systems, control logic, and methods for controlling vehicle propulsion, braking, steering, and suspension systems in response to operator and other input commands that considers a driver-selected mode of operation,

SUMMARY

The concepts described herein relate to a calculation of desired future longitudinal horizons related to torque or acceleration, and desired future lateral horizons related to yaw rate and lateral velocity, and their use in response to driver-selectable modes. In the longitudinal direction, driver inputs of pedal and brake position as well as drivability metrics are used to calculate the desired future torque trajectory. In the lateral direction, the front and rear steering angles may be used with a bicycle model to derive the trajectories. The trajectories are used in a vehicle motion controller that uses weighting to tradeoff competing requests and deliver performance that is consistent with a selected driver mode, such as a tour mode, a sport mode, an off-road mode, a trailering mode, etc.

An aspect of the disclosure includes a system and associated method for operating a vehicle that includes monitoring vehicle operating parameters such as vehicle speed, steering angles, weight, etc. and input commands such as operator inputs to an accelerator pedal, a brake pedal, a steering wheel, and/or an Advanced Driver Assistance System (ADAS). A desired future longitudinal torque horizon is determined based upon the vehicle speed and an operator input to an accelerator pedal; a desired future yaw rate horizon is determined based upon a commanded steering angle; and a desired future lateral speed horizon is determined based upon the commanded steering angle and a lateral speed of the vehicle. Weighting factors are determined based upon a driver-selectable mode, and vehicle operation is controlled based upon the desired future longitudinal torque horizon, the desired future yaw rate horizon, the desired future lateral speed horizon, and the weighting factors.

Another aspect of the disclosure includes receiving, via the controller, a vehicle speed, and an operator command for one of vehicle acceleration or vehicle deceleration, and determining the desired future longitudinal torque horizon based upon the vehicle speed and the operator command for one of vehicle acceleration or vehicle deceleration.

Another aspect of the disclosure includes receiving a vehicle yaw rate, receiving a vehicle longitudinal speed, and receiving an operator command for vehicle steering; and determining the desired future yaw rate horizon based upon the vehicle yaw rate and the operator command for vehicle steering.

Another aspect of the disclosure includes receiving the operator command for vehicle steering in the form of one of a front wheel steering angle and a rear wheel steering angle.

Another aspect of the disclosure includes receiving a vehicle lateral speed, receiving a vehicle longitudinal speed, and receiving an operator command for vehicle steering; and determining the desired future lateral speed horizon based upon the vehicle lateral speed and the operator command for vehicle steering.

Another aspect of the disclosure includes determining the weighting factors for tracking the desired future longitudinal torque horizon, the desired future yaw rate horizon, and the desired future lateral speed horizon based upon the driver-selectable mode and the vehicle operating parameters.

Another aspect of the disclosure includes controlling operation of the propulsion system to minimize a difference between the desired future longitudinal torque horizon and the operator command for torque related to one of vehicle acceleration or vehicle deceleration, and minimizing a difference between the desired future yaw rate horizon and a predicted yaw rate, and a desired future lateral velocity horizon and a predicted velocity.

Another aspect of the disclosure includes controlling operation of the propulsion system to minimize a difference between the desired future longitudinal speed horizon and the operator command for one of vehicle acceleration or vehicle deceleration, and minimizing a difference between the desired future yaw rate horizon and a predicted yaw rate, and a desired future lateral velocity horizon and a predicted torque.

Another aspect of the disclosure includes receiving a vehicle speed, and receiving an input command from an Advanced Driver Assistance System (ADAS) for one of vehicle speed, vehicle acceleration or vehicle deceleration; and determining the desired future longitudinal torque horizon based upon the vehicle speed and the input command from the ADAS for one of vehicle acceleration or vehicle deceleration.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
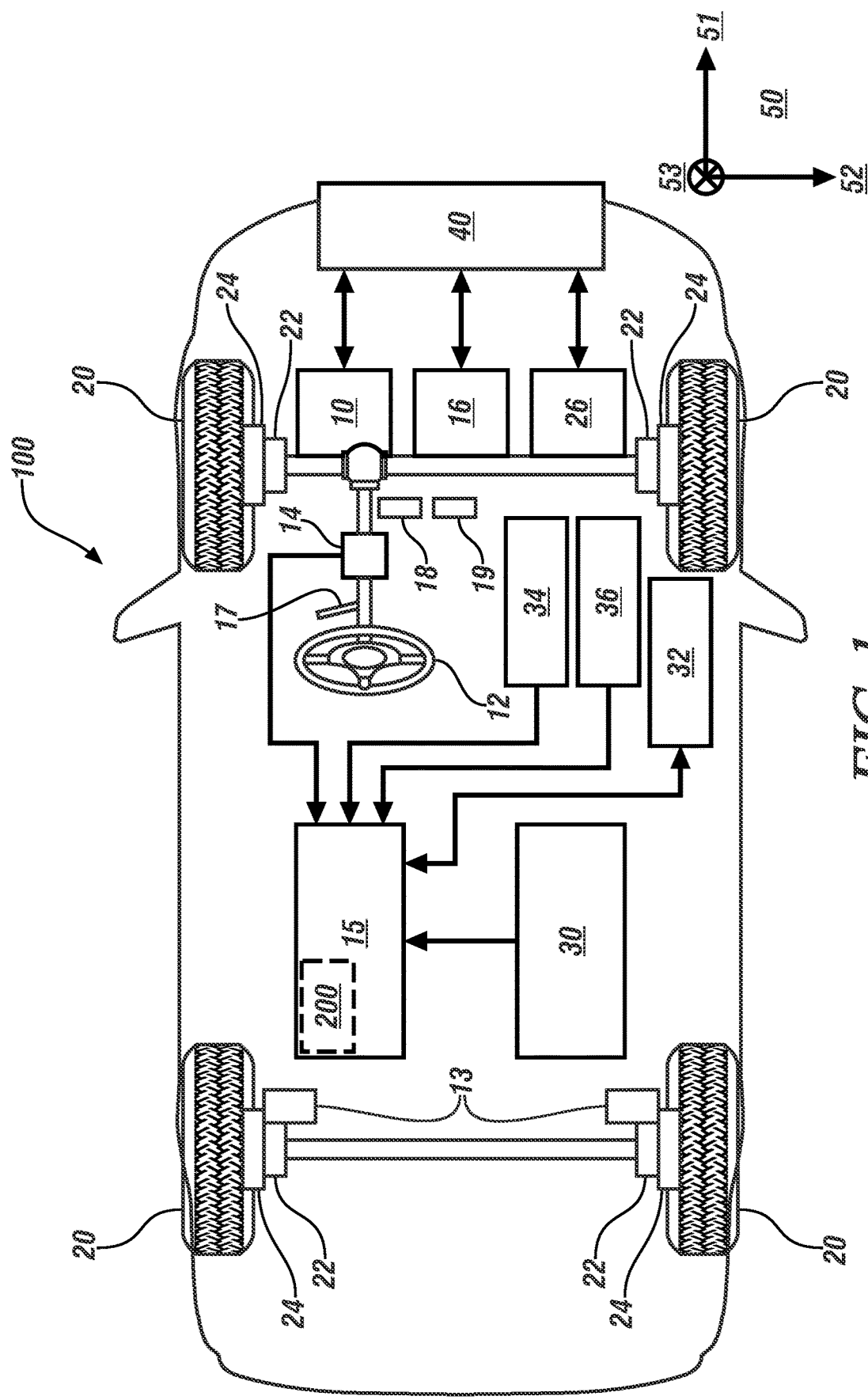
FIG. 1 schematically illustrates a top-view of a vehicle, in accordance with the disclosure.

FIG. 1, consistent with embodiments disclosed herein, schematically illustrates a vehicle 100 that is disposed on a travel surface, wherein the vehicle 100 has operating systems that include a propulsion system 10, a steering system 16, and a wheel braking system 26, all of which are arranged to transfer tractive power, braking (or deceleration) force, and steering force to one or multiple vehicle wheels 20. In some embodiments, the vehicle 100 further includes an advanced driver assistance system (ADAS) 40, which may be coupled with a spatial monitoring system 30 and a navigation system 32. The propulsion system 10, the wheel braking system 26, and the steering system 16 are arranged and controllable to transfer, respectively, tractive power, braking force, and steering force to one or multiple vehicle wheels 20 in response to input commands such as operator inputs to an accelerator pedal 19, a brake pedal 18, a steering wheel 12, and/or an input commands that are generated by the ADAS 40, which may be controlled via an operator interface device 17. Operation of the vehicle 100 including the aforementioned operating systems is controlled by a plurality of controllers that execute control routines, collectively referred to hereinafter as controller 15. As used herein, the term "vehicle" refers to vehicle platforms such as passenger vehicles, commercial vehicles, industrial vehicles, tracked vehicles, off-road and all-terrain vehicles (ATV), motorcycles, farm equipment, watercraft, aircraft, etc., without limitation. Other operator requests may be generated based upon operator input to a transmission range selector, etc.

The propulsion system 10 may be configured as an internal combustion engine coupled to a step-gear transmission or continuously variable transmission that are controlled by a powertrain controller to generate tractive power in response to operator requests and input commands in one embodiment. Alternatively, the propulsion system 10 may be configured as a hybrid powertrain system wherein the tractive power is generated by either or both an internal combustion engine and one or multiple electric machines that are controlled by a powertrain controller to generate tractive power in response to the operator requests and input commands in one embodiment. Alternatively, the propulsion system 10 may be configured as an electric powertrain system wherein the tractive power is generated by one or multiple electric machines that are controlled by a powertrain controller to generate tractive power in response to the operator requests and input commands in one embodiment.

The steering system 16 includes the steering wheel 12 and a steering actuator 14. As shown, the steering system 16 is configured to control steering only in front wheels of the vehicle 100. Alternatively, the steering system 16 may be configured to control steering in the front wheels and the rear wheels of the vehicle 100, as indicated by element 13. Alternatively, the steering system 16 may be configured to control steering only in the rear wheels of the vehicle 100.

The wheel braking system 26 includes wheel speed sensors 22 and wheel brakes 24 to provide mechanical braking effort to the vehicle wheels 20. When the vehicle 100 is configured as a hybrid vehicle or an electric vehicle, the mechanical braking effort provided by the wheel braking system 26 may be supplemented by a regenerative braking effort that is provided by generation of reactive torque through one or multiple electric machines.

The vehicle 100 and the travel surface define a spatial domain in the form of a three-dimensional coordinate system 50 that includes a longitudinal (X) axis 51, a lateral (Y) axis 52 and a vertical (Z) axis 53. The longitudinal axis 51 is defined by a longitudinal axis of the vehicle 100, the lateral axis 52 is defined by a lateral axis of the vehicle 100, and the vertical axis 53 is defined as being orthogonal to a plane defined by the longitudinal axis 51 and the lateral axis 52.

Where employed, the navigation system 32 employs information from a Global Positioning System (GPS) sensor 36 and an Inertial Measurement Unit (IMU) 34. In one embodiment, the GPS sensor 36 is configured as a global navigation satellite system (GNSS) sensor. The IMU 34 is an electronic device that employs one or more of a combination of accelerometers, gyroscopes, and magnetometers to measure and report specific force, angular rate, yaw, and orientation of the vehicle 100.

The ADAS 40 is arranged to provide operator assistance features by controlling one of the operating systems, i.e., one or more of the propulsion system 10, the steering system 16, the wheel braking system 26, in conjunction with or without direct interaction of the vehicle operator via the operator interface device 17. The ADAS 40 includes a controller and one or a plurality of subsystems that provide operator assistance features, including one or more of a fully autonomous driving system, an adaptive cruise control (ACC) system, a lane-keeping control (LKY) system, a lane change control (LCC) system, an autonomous braking/collision avoidance system, and/or other systems that are configured to command and control autonomous vehicle operation separate from or in conjunction with operator requests. The ADAS 40 may interact with and access information from an on-board map database for route planning and to control operation of the vehicle 100 via the lane-keeping system, the lane-centering system, and/or other systems that are configured to command and control autonomous vehicle operation. Autonomous operating commands may be generated to control the ACC system, the LKY system, the LCC system, the autonomous braking/collision avoidance system, and/or the other systems. Vehicle operation may be in response to operator requests and/or the input commands generated by the ADAS 40 or other autonomous vehicle requests. Vehicle operation includes acceleration, braking, steering, steady-state running, coasting, and idling.

The on-board navigation system 32 may include a computer-readable storage device or media (memory) that includes a digitized roadway map and is in communication with the ADAS 40. The concepts described herein may be employed on various systems that may benefit from information determined from an embodiment of the spatial monitoring system 30 in a manner that is described herein.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example, each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
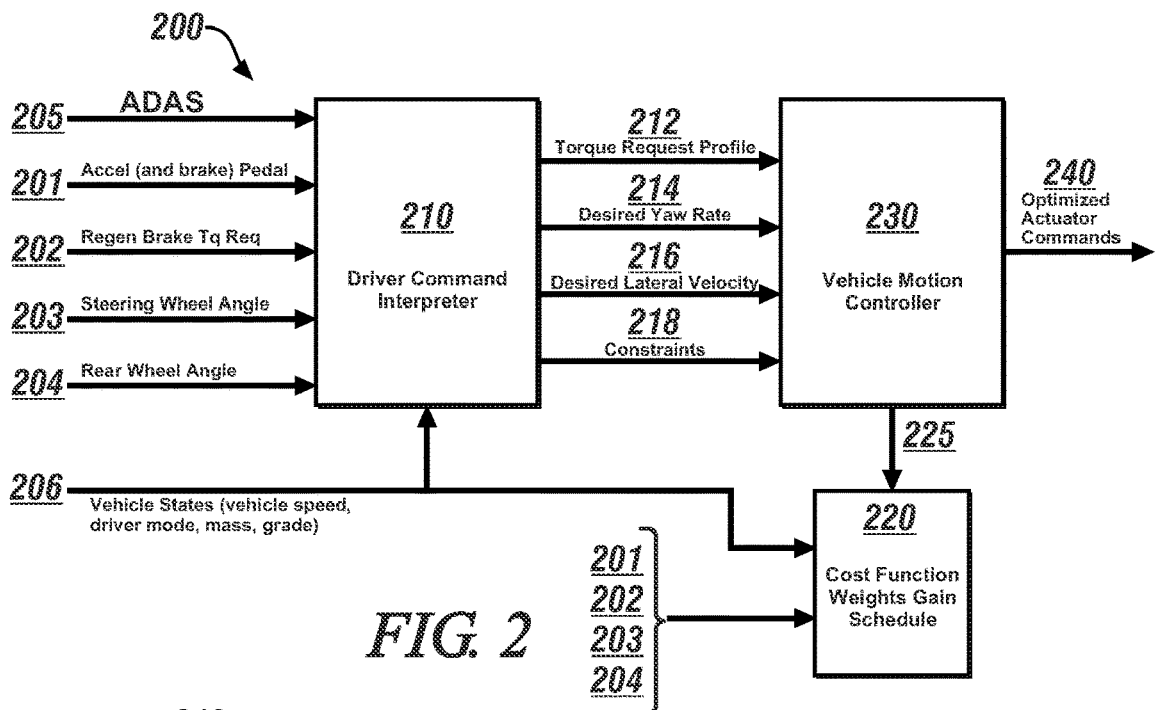
FIGS. 2 through 7 schematically illustrate flowcharts associated with a computer-executable control routine for controlling operation of an embodiment of the vehicle described with reference to FIG. 1, in accordance with the disclosure.

Referring now to FIG. 2, et seq., a control routine 200 that includes a methodology, system and associated structure for controlling operation of an embodiment of the propulsion system 10 for the vehicle 100 that is described with reference to FIG. 1 is set forth in the form of schematic flowcharts. The control routine 200 includes a Driver Command Interpreter (DCI) 210, a cost function routine 220, and a vehicle motion controller (VMC) 230. Operator inputs, vehicle operating parameters and other input commands are provided to the DCI 210, which generates horizon terms for longitudinal acceleration, yaw rate, and lateral velocity. The vehicle operating parameters and other inputs are provided to the cost function routine 220, which generates weighting factors 225 in relation to the longitudinal acceleration, yaw rate, and lateral velocity and driver-selectable modes. The VMC 230 evaluates the horizon terms for longitudinal acceleration, yaw rate, and lateral velocity in view of the weighting factors 225 corresponding to the longitudinal acceleration, yaw rate, and lateral velocity, and determines actuator commands 240 for controlling operation of the propulsion system 10 based thereon. This operation is now described in detail.

The control routine 200 receives, via controller 15, input commands including operator inputs in the form of accelerator/brake pedal commands 201, a regenerative braking torque request 202, a steering wheel angle 203, a rear wheel angle 204.

The control routine 200 also receives, via controller 15, input commands including inputs in the form of an ADAS command 205 on embodiments of the vehicle 100 that are so equipped, such as a vehicle speed command for an adaptive cruise control system. In one embodiment, the ADAS command 205 may also be a horizon that is planned for the near future. Examples of horizons could be a speed velocity (longitudinal and lateral) profile, a longitudinal torque profile and a yaw rate/lateral velocity profile. However the time span of the ADAS horizon is most likely different from the time span of the desired future horizons described herein, and thus would need to be resampled and potentially converted from one unit to another. For example, a velocity profile may be converted to horizons for torque, yaw rate, and lateral speed.

The control routine 200 also receives, via controller 15, vehicle operating states 206 in the form of vehicle mass, road grade, vehicle speed, and the driver-selectable mode. Examples of driver-selectable modes include, e.g., a tour mode, sport mode, tow/haul mode, AWD (all-wheel drive), off-road, etc. The tour mode is intended for everyday driving to optimize fuel economy and drive quality. The sport mode intended to provide a more aggressive acceleration response to provide a fun-to-drive, sporty performance. The Tow/Haul mode is intended to address drivability concerns when pulling a trailer or heavy load, such as adjusting transmission shifting patterns to minimize transmission shift busyness, etc. The AWD mode is intended to help improve normal driving on paved roads that are covered with water, snow or ice. The Off Road mode is intended to adjust operation of the powertrain, braking and steering to help improve traction and maneuverability in an off-road setting.

The input commands and vehicle operating states are provided as inputs to a Driver Command Interpreter (DCI) 210, which is configured to plan future vehicle behaviors over a defined time period, referred to as horizons. The planned vehicle behaviors determined by the DCI 210 include a desired future longitudinal torque horizon 212, a desired future yaw rate horizon 214, and a desired future lateral speed horizon 216. The DCI 210 also determines a plurality of system and operational constraints 218 based thereon. Additional details of the operations of the DCI 210 are described with reference to FIGS. 3 through 7.

The term "horizon" is employed to describe an estimated or predicted behavior for a subject vehicle over a predefined period of time for a specific parameter, e.g., longitudinal torque, yaw rate, lateral speed, etc. Derivation of a horizon may be determined based upon a predefined set of vehicle parameters, such as an effective road load acting on the vehicle from nominal road load forces created using a road load equation with coefficients representing kinetic friction, rolling friction, and aerodynamic drag in conjunction with forces acting on the subject vehicle due to mass and gravity.

Figure 3:
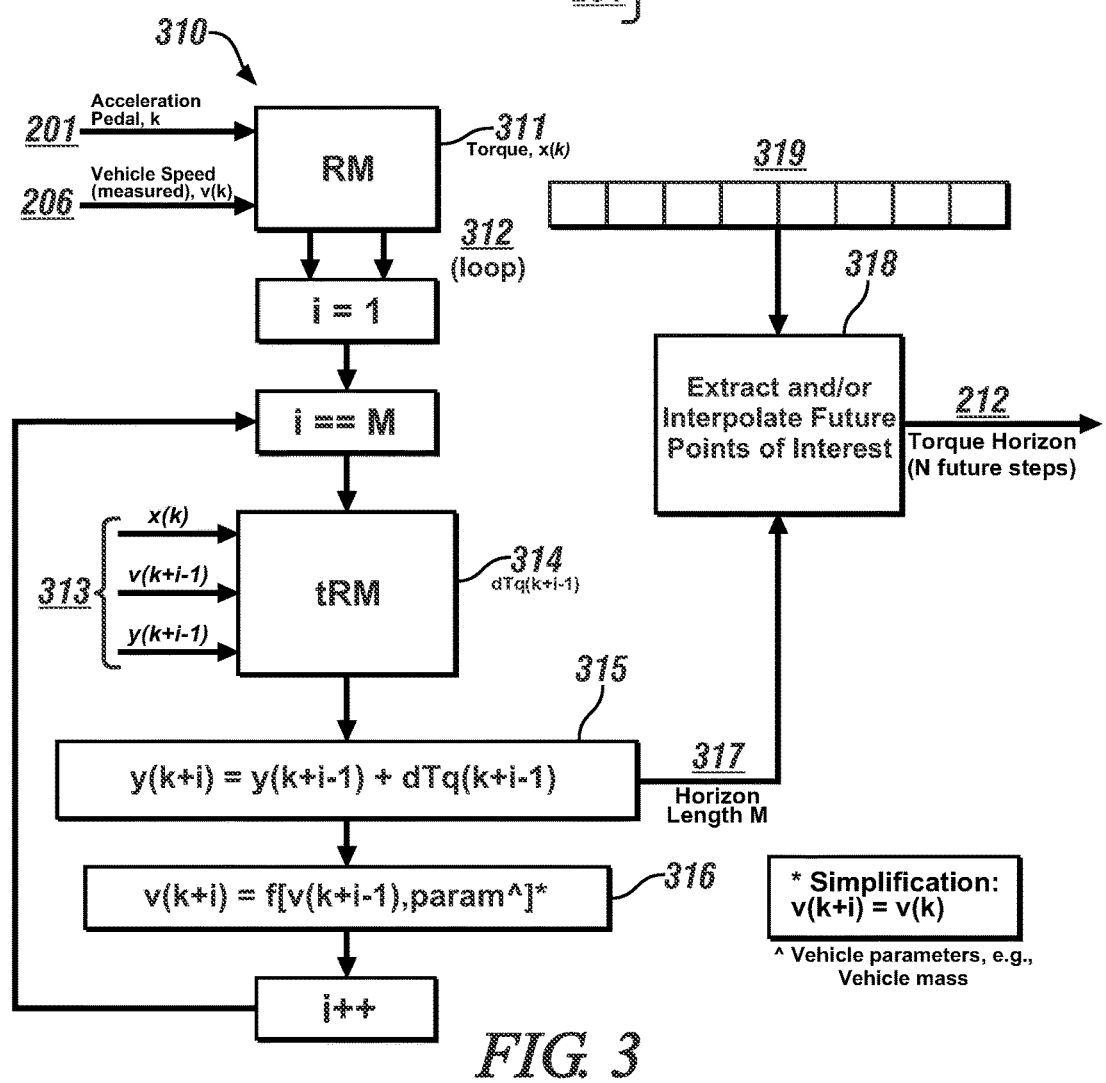

FIG. 3 schematically illustrates process 310, which is a first embodiment of a process for determining the desired future longitudinal torque horizon 212 based upon the vehicle operating state 206 of vehicle speed and the operator input in the form of the accelerator/brake pedal commands 201, which are input to a Response Map (RM) 311 to determine a target longitudinal torque x(k). Alternatively, the RM 311 may determine a target longitudinal acceleration.

The target longitudinal torque x(k) is input to an iterative loop 312 which employs a transient response map (tRM) 314 to determine a target longitudinal torque y(k+1) over a horizon of time length M 317 based upon inputs of longitudinal torque x(k), vehicle speed v(k+i−1), and the target longitudinal torque y(k+i−1) 313, wherein M represents a period of time defined by the horizon. The transient response map 314 determines a differential torque dTq(k+i−1) based upon the target longitudinal torque x(k), the vehicle speed v(k), and target longitudinal torque over a previous iteration y(k+i−1). The differential torque dTq(k+i−1) is combined with the target longitudinal torque over the previous iteration y(k+i−1) (block 315) to determine the target longitudinal torque y(k+1) over the horizon of time length M 317. The iterative loop 312 then updates the vehicle speed v(k+1) (Block 316), and begins the next iteration.

The RM 311 converts driver acceleration and deceleration commands to vehicle drivability targets to a resultant desired vehicle force. Drivability targets, such as those described by vehicle-calibrated response charts and related transient response charts, and vehicle parameters, such as road load coefficients, effective road load, and nominal road load forces, are incorporated into the final speed horizon profile. For some implementations, brake force requests may also be comprehended in the formulation. The RM 311 may be reduced to practice as a table that may include a memory-stored, controller-accessible response map file that maps a succession of vehicle speeds and vehicle acceleration values with a corresponding succession of commanded or desired powertrain torque outputs. Alternatively, the RM3211 may be reduced to practice as a table that may include a memory-stored, controller-accessible response map file that maps a succession of vehicle speeds and vehicle acceleration values with a corresponding succession of commanded or desired acceleration outputs.

Raw pedal travel data in the form of a desired acceleration is employed to look up a driver torque request in the map file in relation to the present vehicle speed and the present pedal position of the accelerator pedal. The driver torque request may be shaped using the transient response map 314, which may be a vehicle-calibrated transient acceleration map. The transient response map 314 may include a memory-stored, controller-accessible transient acceleration response map file. The transient response map 314 may be a lookup table that defines the powertrain torque in transient regions between adjacent powertrain torque output values in the acceleration map file. By way of non-limiting example, the transient response map 314 may identify a respective ramp rate (e.g., change of acceleration or torque per loop) between each pair of neighboring points in the acceleration map file as a function of vehicle speed and torque change, i.e., the difference between a target torque and a current torque. The driver torque request is shaped by incorporating these accel/torque ramp rate responses in order to add curvature to the torque request profile.

The target longitudinal torque y(k+1) over the horizon of time length M 317 is provided to an extraction step 318, which identifies a future point of interest of length N (319), wherein N (319) may be a suitable time length, e.g., 1 ms, 2 ms, 3 ms, 4 ms, 5 ms, 100 ms, 200 ms, 300 ms, 400 ms, etc., so long as time length N is less than horizon of time length M 317. The extraction step 318 interpolates or otherwise determines the desired future longitudinal torque horizon 212 over time length N, which is supplied to the VMC 230.

Figure 4:
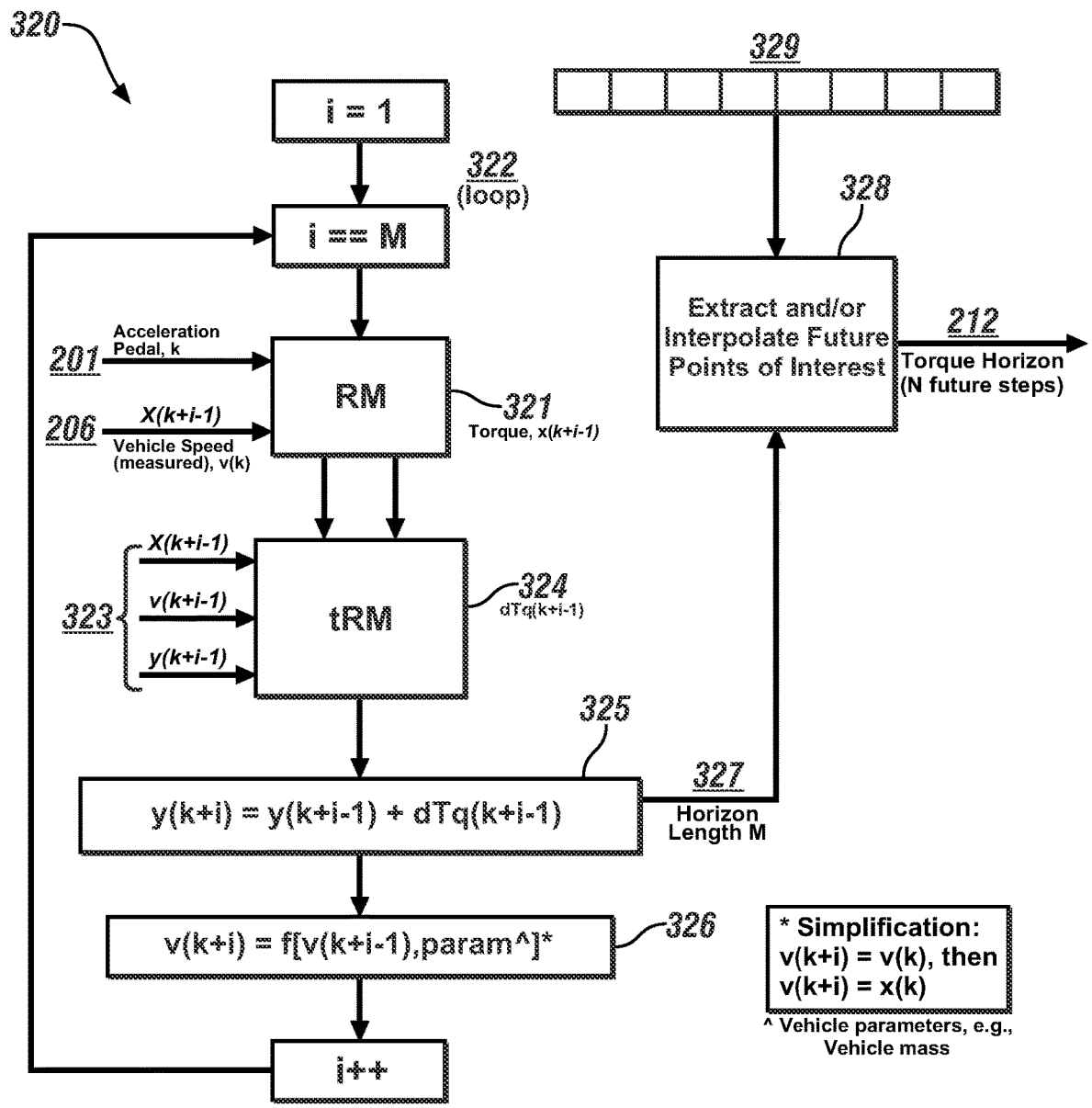

FIG. 4 schematically illustrates process 320, which is a second embodiment of a process for determining the desired future longitudinal torque horizon 212 based upon the vehicle operating states 206 including vehicle speed and the operator input in the form of the accelerator/brake pedal commands 201. In this embodiment, the Response Map (RM) 321 is included in the iterative loop 322. The RM 321 determines a target longitudinal torque x(k), which is input to transient response map (tRM) 324 to determine a target longitudinal torque y(k+1) over a horizon of time length M 327 based upon inputs of longitudinal torque x(k), vehicle speed v(k+i−1), and the target longitudinal torque y(k+i−1) 323, wherein M represents a period of time defined by the horizon. The transient response map 324 determines a differential torque dTq(k+i−1) based upon the target longitudinal torque x(k), the vehicle speed v(k), and target longitudinal torque over a previous iteration y(k+i−1). The differential torque dTq(k+i−1) is combined with the target longitudinal torque over the previous iteration y(k+i−1) (block 325) to determine the target longitudinal torque y(k+1) over the horizon of time length M 327. The iterative loop 322 then updates the vehicle speed v(k+1) (Block 326), and begins the next iteration. The transient response map 324 is analogous to the transient response map 314 described with reference to FIG. 3.

The target longitudinal torque y(k+1) over the horizon of time length M 327 is provided to an extraction step 328, which identifies a future point of interest of length N (329), wherein N (329) may be a suitable time length, e.g., 1 ms, 2 ms, 3 ms, 4 ms, 5 ms, 100 ms, 200 ms, 300 ms, 400 ms, etc., so long as time length N is less than horizon of time length M. The extraction step 328 interpolates or otherwise determines the desired future longitudinal torque horizon 212 over time length N, which is supplied to the VMC 230.

Figure 5:
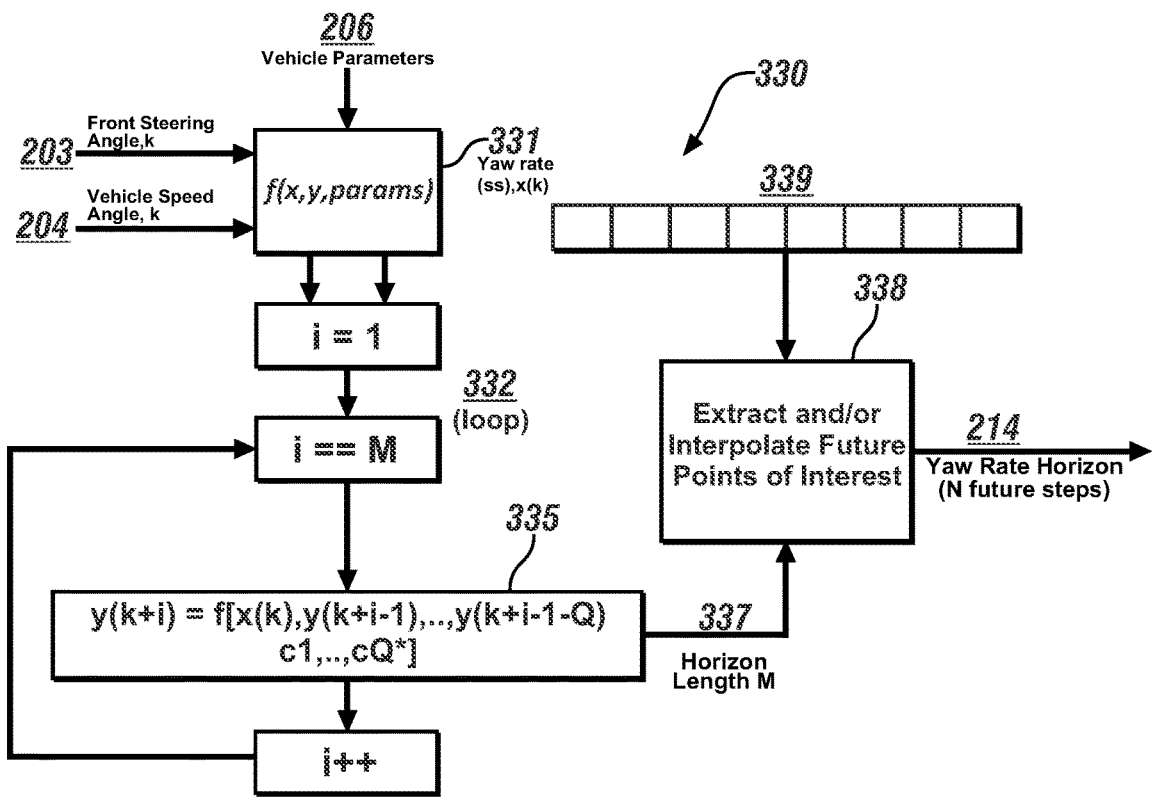

FIG. 5 schematically illustrates process 330, which is an embodiment of a process for determining the desired future yaw rate horizon 214 based upon the vehicle operating states 206, the steering wheel angle 203 and the rear wheel angle 204, where applicable.

In this embodiment, a target steady-state yaw rate is determined based upon vehicle operating states 206, the steering wheel angle 203 and the rear wheel angle 204 (Block 331). An iterative loop 332 is executed to determine a target yaw rate x(k+1) (Block 335), in accordance with the following relationship:

$$y(k+i)=f[x(k),y(k+i-1),\ldots,y(k+i-1-Q),c1,\ldots,cQ^*]$$

wherein y(k+1) represents the target yaw rate; and c1, . . . , cQ are tuned to define a desired vehicle dynamic response.

The target yaw rate y(k+1) is extrapolated over a horizon of time length M 337, wherein M represents a period of time defined by the horizon. The iterative loop 332 updates the target yaw rate y(k+1) and begins the next iteration.

The target yaw rate y(k+1) over the horizon of time length M 337 is provided to an extraction step 338, which identifies a future point of interest of length N, (339), wherein N (339) may be a suitable time length, e.g., 1 ms, 2 ms, 3 ms, 4 ms, 5 ms, 100 ms, 200 ms, 300 ms, 400 ms, etc., so long as time length N is less than horizon of time length M 337. The extraction step 338 interpolates or otherwise determines the desired future yaw rate horizon 214 over time length N, which is supplied to the VMC 230.

Figure 6:
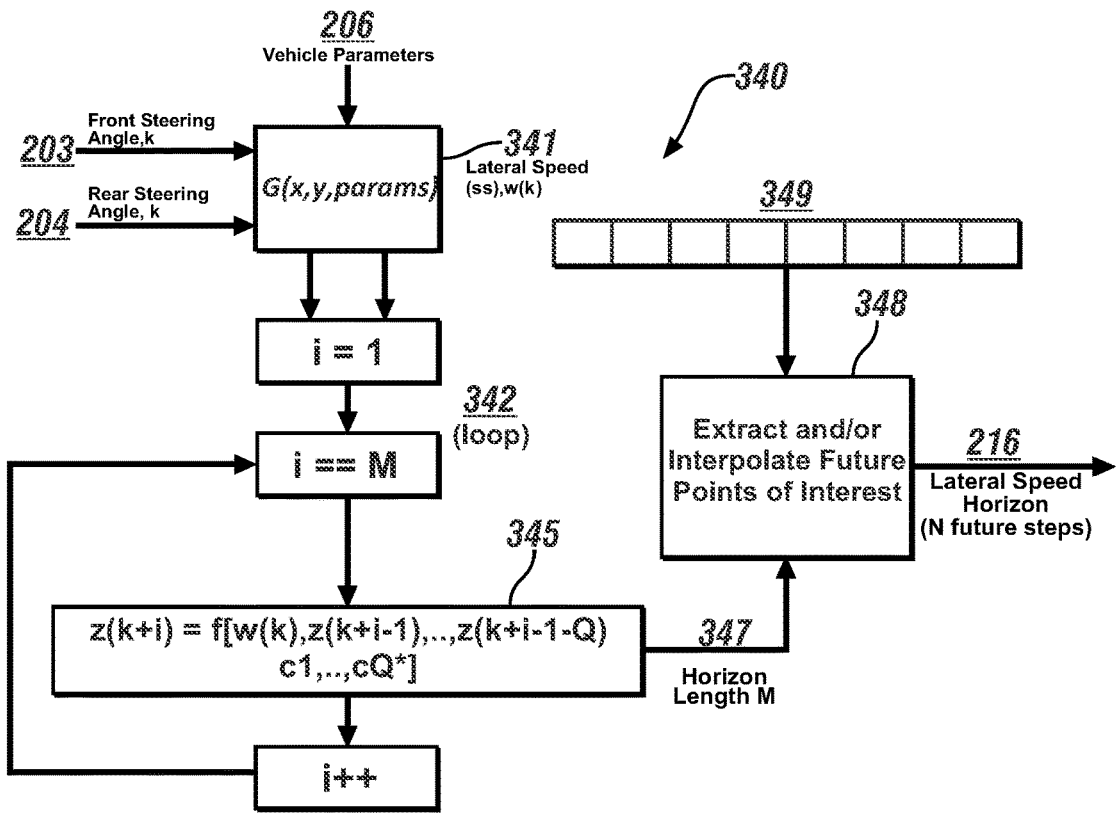

FIG. 6 schematically illustrates process 340, which is an embodiment of a process for determining the desired future lateral speed horizon 216 based upon the vehicle operating states 206, the steering wheel angle 203 and the rear wheel angle 204, where applicable.

In this embodiment, a target lateral speed is determined based upon vehicle operating states 206, the steering wheel angle 203 and the rear wheel angle 204 (Block 341). An iterative loop 342 is executed to determine a target lateral speed z(k+1) (Block 345), in accordance with the following relationship:

$$y(k+i) = f[w(k), z(k+i-1), \ldots, z(k+i-1-Q), c1, \ldots, cQ^*]$$

wherein z(k+1) represents the target lateral speed; and c1, . . . , cQ are tuned to define a desired vehicle dynamic response.

The target lateral speed z(k+1) is extrapolated over a horizon of time length M 347, wherein M represents a period of time defined by the horizon. The iterative loop 342 updates the vehicle lateral speed z(k+1) and begins the next iteration.

The target lateral speed z(k+1) over the horizon of time length M 347 is provided to an extraction step 348, which identifies a future point of interest of length N(349), wherein N (319) may be a suitable time length, e.g., 1 ms, 2 ms, 3 ms, 4 ms, 5 ms, 100 ms, 200 ms, 300 ms, 400 ms, etc., so long as time length N is less than horizon of time length M 347. The extraction step 348 interpolates or otherwise determines the desired future lateral speed horizon 216 over time length N, which is supplied to the VMC 230.

Figure 7:
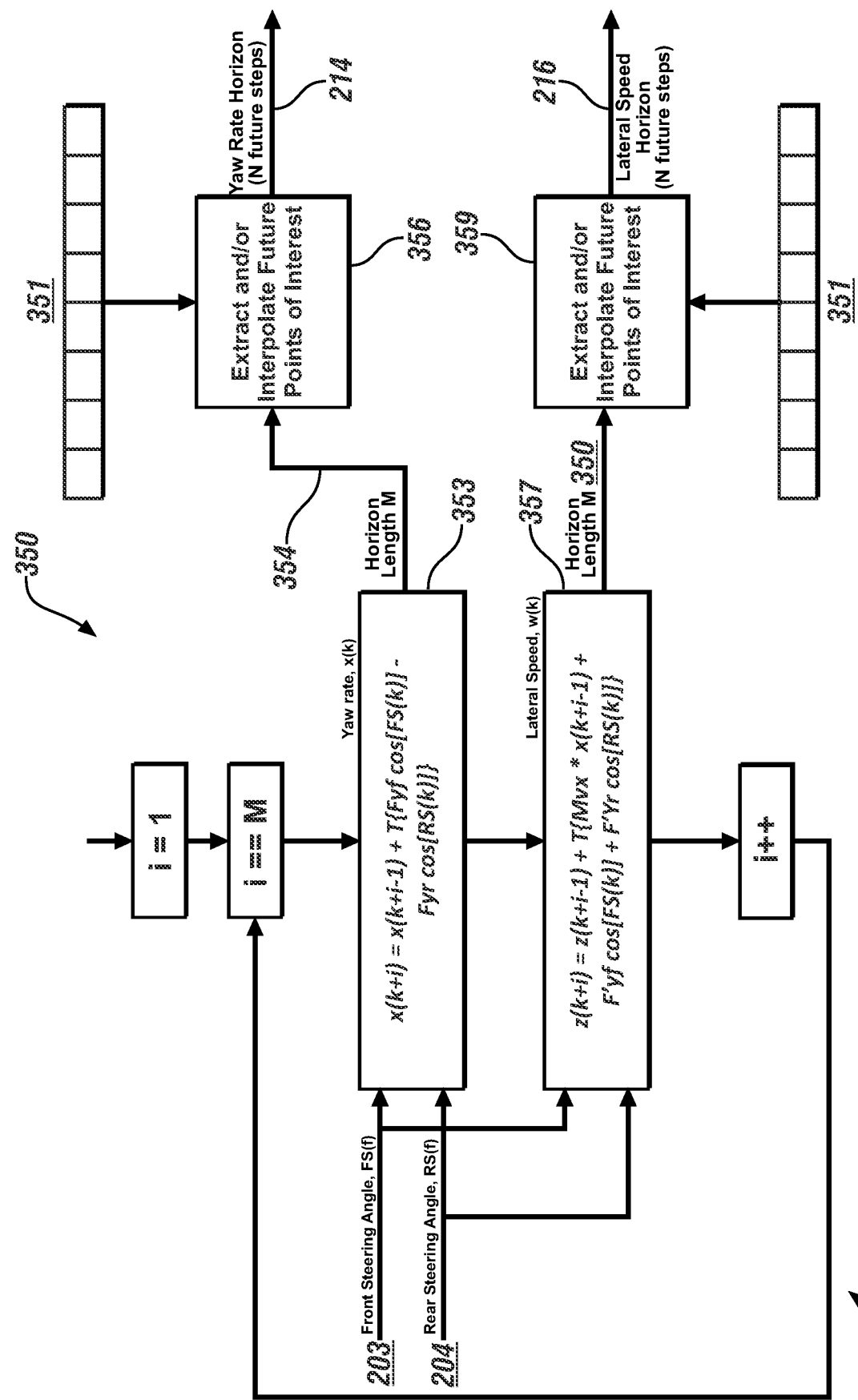

FIG. 7 schematically illustrates process 350, which is an embodiment of a process for coincidently determining the desired future yaw rate horizon 214 and the desired future lateral speed horizon 216 based upon the vehicle operating states 206, the steering wheel angle 203 and the rear wheel angle 204, where applicable.

In this embodiment, an iterative loop 352 is executed to determine a target yaw rate x(k+1) (Block 353), in accordance with the following relationship:

$$x(k+i) = x(k+i-1) + T\{Fyf \cos[FS(k)] - Fyr \cos[RS(k)]\}$$

wherein

Fyf represents the lateral force at the front axle;

Fyr represents the lateral force at the rear axle;

FS(k) represents the front steering angle;

RS(k) represents the rear steering angle;

x(k+1) represents the target or desired yaw rate; and c1, . . . , cQ are tuned to define a desired vehicle dynamic response.

The target yaw rate x(k+1) in this relationship is extrapolated over a horizon of time length M 354, wherein M represents a period of time defined by the horizon.

The target yaw rate x(k+1) over the horizon of time length M 354 is provided to an extraction step 356, which identifies a future point of interest of length N, wherein N may be a suitable time length, e.g., 1 ms, 2 ms, 3 ms, 4 ms, 5 ms, 100 ms, 200 ms, 300 ms, 400 ms, etc., so long as time length N is less than horizon of time length M. The extraction step 356 interpolates or otherwise determines the desired future yaw rate horizon 214 over time length N, which is supplied to the VMC 230.

The iterative loop 352 provides the target yaw rate x(k+1) as an input to Block 357.

The vehicle yaw rate x(k+1) from Block 353, the vehicle operating states 206, the steering wheel angle 203 and the rear wheel angle 204 are employed to determine the target lateral speed z(k+1) (Block 357), in accordance with the following relationship:

$$z(k+i) = z(k+i-1) + T\{Mvx^* x(k+i-1) + F'yf \cos[FS(k)] + F'yr \cos[RS(k)]\}$$

wherein

M represents vehicle mass;

vx represents vehicle longitudinal speed;

Fyf represents the lateral force at the front axle;

Fyr represents the lateral force at the rear axle; and c1, . . . , cQ are tuned to define a desired vehicle dynamic response.

The target lateral speed z(k+1) is extrapolated over a horizon of time length M 351, wherein M represents a period of time defined by the horizon. The iterative loop 352 begins the next iteration.

The target lateral speed z(k+1) over the horizon of time length M 351 is provided to an extraction step 359, which identifies a future point of interest of length N, wherein N may be a suitable time length, e.g., 1 ms, 2 ms, 3 ms, 4 ms, 5 ms, 100 ms, 200 ms, 300 ms, 400 ms, etc., so long as time length N is less than horizon of time length M 351. The extraction step 359 interpolates or otherwise determines the desired future lateral speed horizon 216 over time length N, which is supplied to the VMC 230.

Figure 8:
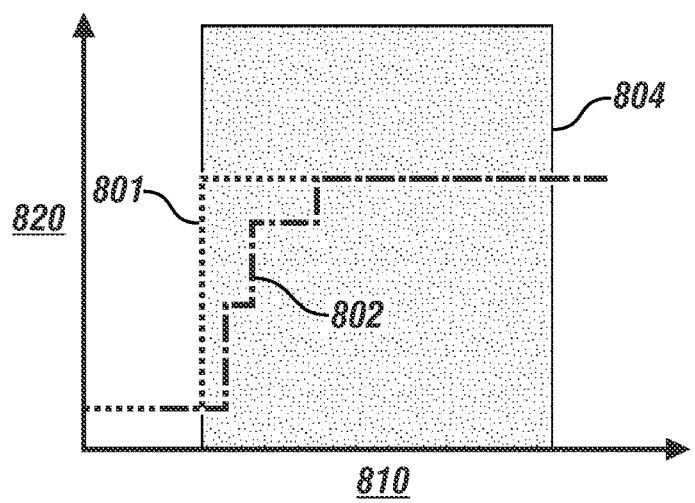
FIG. 8 graphically shows shaping of longitudinal torque horizon with a response map and a transient response map, in accordance with the disclosure.

FIG. 8 graphically illustrates shaping of longitudinal torque horizon based upon a driver request in relation to time, with torque indicated on the vertical axis 820 and time indicated on the horizontal axis 810. Line 801 indicates an unshaped, arbitrated driver torque request in the form of a step input to an accelerator pedal, such as may occur when a driver makes a wide open throttle maneuver. Line 802 indicates the driver requested torque upon being subject to rate limiting and filtering as described with reference to FIGS. 2 and 3, with the horizon being indicated by area 804. Line 803 indicates actual performance of the powertrain system in response to the torque request associated with Line 802.

Figure 9:
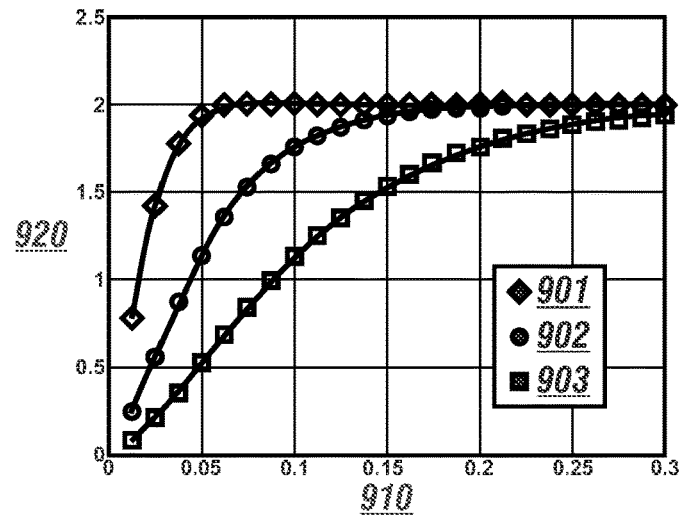
FIG. 9 graphically shows different horizon responses of lateral motion (yaw rate or lateral velocity) according to aggressive or normal or conservative driver modes that can be achieved by setting different filtering parameters or cost function weights, in accordance with the disclosure.

FIG. 9 graphically illustrates different horizon responses of lateral motion (yaw rate or lateral velocity) according to driver modes of aggressive 901, normal 902 or conservative 903, with lateral motion indicated on the vertical axis 920 and time indicated on the horizontal axis 910. The different horizon responses of lateral motion (yaw rate or lateral velocity) can be achieved by setting different filtering parameters or cost function weights, for example as illustrated with reference to FIG. 10.

Figure 10:
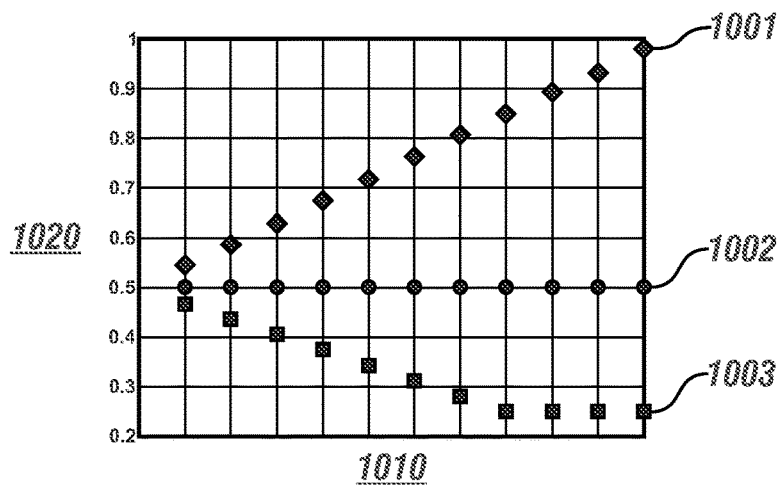
FIG. 10 graphically shows different gain settings for corresponding to different horizon responses.

FIG. 10 graphically shows different gain settings corresponding to the different horizon responses according to the driver modes of aggressive 1001, normal 1002 or conservative 1003, with the gain setting indicated on the vertical axis 1020 and time indicated on the horizontal axis 1010.

Referring again to FIG. 2, the vehicle operating parameters and other inputs are provided to the cost function routine 220 to generate weighting factors 225 corresponding to the longitudinal acceleration, yaw rate, and lateral velocity. The input commands include operator inputs in the form of accelerator/brake pedal commands 201, regenerative braking torque request 202, steering wheel angle 203, rear wheel angle 204, vehicle operating states 206 in the form of vehicle mass, road grade, vehicle speed, and the driver-selectable mode. At every loop, the control routine 200 optimizes a cost function of the following form:

$$\text{Sum}\_k=0,\hat{}k=N(T\text{Wght}\_k[T\text{pred}\_k-T\text{horizon}\_k]\hat{}2)+ \\ \text{Sum}\_k=0,\hat{}k=N(R\_\text{Wght}\_k[R\_\text{pred}\_k-R\_\text{Horizon}\_k]\hat{}2)+\text{Sum}\_k=0,\hat{}k=N(Vy\text{Wght}\_k[Vy\text{pred}\_k-Vy\text{Horizon}\_k]\hat{}2)+f(.,.,.)$$

where:
TWght_k is the weight at time k for the longitudinal torque horizon,
R_Wght_k is the weight at time k for the yaw rate horizon,
VyWght_k is the weight at time k for the lateral speed,
Tpred is the predicted longitudinal torque,
R is the predicted yaw rate, and
Vypred is the predicted lateral speed.

The weighting factors 225 are associated with the desired future longitudinal torque horizon 212, the desired future yaw rate horizon 214, and the desired future lateral speed horizon 216, with weights Tpred, R, and Vypred corresponding to the longitudinal acceleration, yaw rate, and lateral velocity, respectively, and provided as inputs to the VMC 230. Adjusting the weights in the cost function based on vehicle operating conditions allows its output to better reflect the driver's desired vehicle behavior.

The VMC 230 evaluates the desired future longitudinal torque horizon 212, the desired future yaw rate horizon 214, and the desired future lateral speed horizon 216 in view of the weighting factors 225 corresponding to the longitudinal acceleration, yaw rate, and lateral velocity, and to determines an actuator command 240 for controlling operation of the propulsion system 10 based thereon.

Referring again to FIG. 2, the VMC 230 includes executable routines to perform a model-based control analysis to determine an actuator command 240 for controlling operation of the propulsion system 10 to achieve the driver's desired acceleration command and/or deceleration command 201. To perform this analysis, the VMC 230 aggregates and analyzes the desired future longitudinal torque horizon 212, the desired future yaw rate horizon 214, the desired future lateral speed horizon 216, and the plurality of system and operational constraints 218. The VMC 230 may store a model of the vehicle, such as a dual-track bicycle model, in which the torque commands, the yaw rate, and the lateral speed are the control variables. The model may be derived using first principles or experimentally determined, or a combination of both. Optimization techniques may be used to calculate the torque commands that minimize a tracking error, subject to vehicle constraints. In torque control, the error may be considered between the torque request and the commanded controller torque in a closed-loop manner to minimize a difference between the desired torque horizon and the predicted torque, and to minimize a difference between a desired yaw rate and a desired lateral velocity, and a predicted yaw rate and predicted velocity. A desired future trajectory may be used by the VMC 230 to optimize actuator commands based on desired future desired trajectories and measurements.

The concepts herein include the calculation of desired future longitudinal horizons for torque or acceleration, and desired future lateral horizons for yaw rate and lateral velocity, and their use for achieving expected driver modes. In the longitudinal direction, driver inputs of pedal and brake position as well as drivability metrics are used to calculate the desired future torque trajectory. In the lateral direction, the front and rear steering angles are used with a bicycle model to derive the trajectories. The trajectories are used in a vehicle motion controller that uses weighing to tradeoff competing requests and deliver performance that is consistent with a selected driver mode. This includes determination of the desired future longitudinal torque horizon using the Response Map (RM) and the transient response map based on driver and regenerative braking requests.

The concepts described herein include calculation of desired future lateral yaw rate and lateral speed based on a simplified bicycle model and front and rear steering angles.

The concepts described herein include employing the longitudinal and lateral horizons and weighing their costs in a vehicle motion controller in order to deliver vehicle behavior consistent with a selected driver mode.

The concepts described herein enable variable sampling time of the horizons to maximize accuracy while reducing memory and communication demands.

The concepts described herein include determination of the desired future longitudinal acceleration horizon using a pedal acceleration response map as well as a transient response map.

The concepts described herein include providing for determination and use of the desired future longitudinal torque horizon, desired future yaw rate horizon, desired future lateral speed horizon, and vehicle constraints in a vehicle motion controller to deliver vehicle behavior consistent with and expected driver mode response, managing competing objectives in longitudinal acceleration and lateral acceleration.

The block diagrams in the flow diagrams illustrate the architecture, functionality, and operation of possible implementations of systems, methods, and computer program products according to various embodiments of the present disclosure. In this regard, each block in the block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for operating a vehicle including a propulsion system, the method comprising:
receiving, via a controller, vehicle operating parameters and input commands, including receiving a vehicle yaw rate, receiving a vehicle longitudinal speed, and receiving an operator command for vehicle steering, wherein receiving the operator command for vehicle steering includes receiving a front wheel steering angle and a rear wheel steering angle;
receiving, via the controller, a driver-selectable mode;
determining, via the controller, a desired future trajectory using the front wheel steering angle and the rear wheel steering angle with a dual-track bicycle model in which the input commands and the vehicle operating parameters are control variables;
determining a desired future longitudinal torque horizon based upon the vehicle operating parameters and the input commands;
determining a desired future yaw rate horizon based upon the vehicle operating parameters and the input commands, including based upon the vehicle yaw rate, the vehicle longitudinal speed, and the operator command for vehicle steering;
determining a desired future lateral speed horizon based upon the vehicle operating parameters and the input command;
determining weighting factors for the desired future longitudinal torque horizon, the desired future yaw rate horizon, and the desired future lateral speed horizon based upon the driver-selectable mode; and
controlling, via the controller, operation of the propulsion system based upon the determined desired future trajectory, the desired future longitudinal torque horizon, the desired future yaw rate horizon, the desired future lateral speed horizon, and the weighting factors.

2. The method of claim 1, wherein receiving, via the controller, vehicle operating parameters and input commands comprises receiving a vehicle speed, and receiving an operator command for one of vehicle acceleration or vehicle deceleration; and
wherein determining the desired future longitudinal torque horizon based upon the vehicle operating parameters and the input commands comprises determining the desired future longitudinal torque horizon based upon the vehicle speed and the operator command for one of vehicle acceleration or vehicle deceleration.

3. The method of claim 1, wherein receiving, via the controller, vehicle operating parameters and input commands comprises receiving a vehicle lateral speed, receiving a vehicle longitudinal speed, and receiving an operator command for vehicle steering; and
wherein determining the desired future lateral speed horizon based upon the vehicle operating parameters and the input commands comprises determining the desired future lateral speed horizon based upon the vehicle lateral speed, the vehicle longitudinal speed, and the operator command for vehicle steering.

4. The method of claim 1, further comprising determining the weighting factors for tracking the desired future longitudinal torque horizon, the desired future yaw rate horizon, and the desired future lateral speed horizon based upon the driver-selectable mode and the vehicle operating parameters.

5. The method of claim 1, wherein controlling, via the controller, operation of the propulsion system based upon the desired future longitudinal torque horizon, the desired future yaw rate horizon, the desired future lateral speed horizon, and the weighting factors comprises controlling operation of the propulsion system to minimize a difference between the desired future longitudinal torque horizon and an operator command for one of vehicle acceleration or vehicle deceleration, and minimize a difference between the desired future yaw rate horizon and a predicted yaw rate, and a desired future lateral velocity horizon and a predicted lateral velocity.

6. The method of claim 1, wherein receiving, via the controller, vehicle operating parameters and input commands comprises receiving a vehicle speed, and receiving an input command from an Advanced Driver Assistance System (ADAS) for one of vehicle acceleration or vehicle deceleration; and
wherein determining the desired future longitudinal torque horizon based upon the vehicle operating parameters and the input commands comprises determining the desired future longitudinal torque horizon based upon the vehicle speed and the input command from the ADAS for one of vehicle acceleration or vehicle deceleration.

7. A method for operating a vehicle including a propulsion system, the method comprising:
receiving, via a controller, vehicle operating parameters and input commands, including receiving a vehicle yaw rate, receiving a vehicle longitudinal speed, and receiving an operator command for vehicle steering, wherein receiving the operator command for vehicle steering includes receiving a front wheel steering angle and a rear wheel steering angle
receiving, via the controller, a driver-selectable mode;
determining, via the controller, a desired future trajectory using the front wheel steering angle and the rear wheel steering angle with a dual-track bicycle model in which the input commands and the vehicle operating parameters are control variables;
determining a desired future longitudinal acceleration horizon based upon the vehicle operating parameters and the input commands;
determining a desired future yaw rate horizon based upon the vehicle operating parameters and the input commands, including based upon the vehicle yaw rate, the vehicle longitudinal speed, and the operator command for vehicle steering;
determining a desired future lateral speed horizon based upon the vehicle operating parameters and the input commands;
determining weighting factors for the desired future longitudinal acceleration horizon, the desired future yaw rate horizon, and the desired future lateral speed horizon based upon the driver-selectable mode; and
controlling, via the controller, operation of the propulsion system based upon the determined desired future trajectory, the desired future longitudinal acceleration horizon, the desired future yaw rate horizon, the desired future lateral speed horizon, and the weighting factors.

8. The method of claim 7, wherein receiving, via the controller, vehicle operating parameters and input commands comprises receiving a vehicle speed, and receiving an operator command for one of vehicle acceleration or vehicle deceleration; and
wherein determining the desired future longitudinal acceleration horizon based upon the vehicle operating parameters and the input commands comprises determining the desired future longitudinal acceleration horizon based upon the vehicle speed and the operator command for one of vehicle acceleration or vehicle deceleration.

9. The method of claim 7, wherein receiving, via the controller, vehicle operating parameters and input commands comprises receiving a vehicle lateral speed, receiving a vehicle longitudinal speed, and receiving an operator command for vehicle steering; and
wherein determining the desired future lateral speed horizon based upon the vehicle operating parameters and the input commands comprises determining the desired future lateral speed horizon based upon the vehicle lateral speed, the vehicle longitudinal speed, and the operator command for vehicle steering.

10. The method of claim 7, further comprising determining the weighting factors for tracking the desired future longitudinal acceleration horizon, the desired future yaw rate horizon, and the desired future lateral speed horizon based upon the driver-selectable mode and the vehicle operating parameters.

11. The method of claim 7, wherein controlling, via the controller, operation of the propulsion system based upon the desired future longitudinal acceleration horizon, the desired future yaw rate horizon, the desired future lateral speed horizon, and the weighting factors comprises controlling operation of the propulsion system to minimize a difference between the desired future longitudinal acceleration horizon and an operator command for one of vehicle acceleration or vehicle deceleration, and minimize a difference between the desired future yaw rate horizon and a predicted yaw rate, and a desired future lateral velocity horizon and a predicted lateral velocity.

12. The method of claim 7, wherein receiving, via the controller, vehicle operating parameters and input commands comprises receiving a vehicle speed, and receiving an input command from an Advanced Driver Assistance System (ADAS) for one of vehicle acceleration or vehicle deceleration; and
wherein determining the desired future longitudinal acceleration horizon based upon the vehicle operating parameters and the input commands comprises determining the desired future longitudinal acceleration horizon based upon the vehicle speed and the input command from the ADAS for one of vehicle acceleration or vehicle deceleration.

13. A vehicle system, comprising:
a propulsion system, a steering system, and a wheel braking system that are operatively connected to a controller, the controller including an instruction set that is executable to:
receive vehicle operating parameters and input commands, including receive a vehicle yaw rate, receive a vehicle longitudinal speed, and receive an operator command for vehicle steering, wherein the operator command for vehicle steering includes a front wheel steering angle and a rear wheel steering angle;
receive a driver-selectable mode;
determine a desired future trajectory using the front wheel steering angle and the rear wheel steering angle with a dual-track bicycle model in which the input commands and the vehicle operating parameters are control variables;
determine a desired future longitudinal torque horizon based upon the vehicle operating parameters and the input commands;

determine a desired future yaw rate horizon based upon the vehicle operating parameters and the input commands, including based upon the vehicle yaw rate, the vehicle longitudinal speed, and the operator command for vehicle steering;
determine a desired future lateral speed horizon based upon the vehicle operating parameters and the input commands;
determine weighting factors for the desired future longitudinal torque horizon, the desired future yaw rate horizon, and the desired future lateral speed horizon based upon the driver-selectable mode; and
control, via the controller, operation of the propulsion system based upon the determined desired future trajectory, the desired future longitudinal torque horizon, the desired future yaw rate horizon, the desired future lateral speed horizon, and the weighting factors.

14. The system of claim 13, wherein the instruction set being executable to receive vehicle operating parameters and input commands comprises the instruction set being executable to receive a vehicle speed, and receive an operator command for one of vehicle acceleration or vehicle deceleration; and
wherein the instruction set being executable to determine the desired future longitudinal torque horizon based upon the vehicle operating parameters and the input commands comprises the instruction set being executable to determine the desired future longitudinal torque horizon based upon the vehicle speed and the operator command for one of vehicle acceleration or vehicle deceleration.

15. The system of claim 13, wherein the instruction set being executable to receive the vehicle operating parameters and input commands comprises the instruction set being executable to receive a vehicle lateral speed, receiving a vehicle longitudinal speed, and receiving an operator command for vehicle steering; and
wherein the instruction set being executable to determine the desired future lateral speed horizon based upon the vehicle operating parameters and the input commands comprises the instruction set being executable to determine the desired future lateral speed horizon based upon the vehicle lateral speed, the vehicle longitudinal speed, and the operator command for vehicle steering.

16. The method of claim 1, further comprising determining the desired future yaw rate horizon via executing an iterative loop using a relationship $x(k+i)=x(k+i-1)+T\{Fyf \cos[FS(k)]-Fyr \cos[RS(k)]\}$;
wherein:
Fyf represents the lateral force at the front axle;
Fyr represents the lateral force at the rear axle;
FS(k) represents the front steering angle;
RS(k) represents the rear steering angle; and
x(k+1) represents the target or desired yaw rate.

17. The method of claim 1, further comprising determining the desired future lateral speed horizon via executing an iterative loop using a relationship $z(k+i)=z(k+i-1)+T\{Mvx*x(k+i-1)+Fyf \cos[FS(k)]+Fyr \cos[RS(k)]\}$;
wherein:
M represents vehicle mass;
vx represents vehicle longitudinal speed;
Fyf represents the lateral force at the front axle;
Fyr represents the lateral force at the rear axle; and
z(k+1) represents the target lateral speed.

18. The method of claim 7, further comprising determining the desired future yaw rate horizon via executing an iterative loop using a relationship $x(k+i)=x(k+i-1)+T\{Fyf \cos[FS(k)]-Fyr \cos[RS(k)]\}$;
 wherein:
  Fyf represents the lateral force at the front axle;
  Fyr represents the lateral force at the rear axle;
  FS(k) represents the front steering angle;
  RS(k) represents the rear steering angle; and
  x(k+1) represents the target or desired yaw rate; and
determining the desired future lateral speed horizon via executing an iterative loop using a relationship $z(k+i)=z(k+i-1)+T\{Mvx*x(k+i-1)+Fyf \cos[FS(k)]+Fyr \cos[RS(k)]\}$;
 wherein:
  M represents vehicle mass;
  vx represents vehicle longitudinal speed;
  Fyf represents the lateral force at the front axle;
  Fyr represents the lateral force at the rear axle; and
  z(k+1) represents the target lateral speed.

19. The system of claim 13, wherein the instruction set being executable to determine the desired future yaw rate horizon via executing an iterative loop using a relationship $x(k+i)=x(k+i-1)+T\{Fyf \cos[FS(k)]-Fyr \cos[RS(k)]\}$;
 wherein:
  Fyf represents the lateral force at the front axle;
  Fyr represents the lateral force at the rear axle;
  FS(k) represents the front steering angle;
  RS(k) represents the rear steering angle; and
  x(k+1) represents the target or desired yaw rate.

20. The system of claim 13, wherein the instruction set being executable to determine the desired future lateral speed horizon via executing an iterative loop using a relationship $z(k+i)=z(k+i-1)+T\{Mvx*x(k+i-1)+Fyf \cos[FS(k)]+Fyr \cos[RS(k)]\}$;
 wherein:
  M represents vehicle mass;
  vx represents vehicle longitudinal speed;
  Fyf represents the lateral force at the front axle;
  Fyr represents the lateral force at the rear axle; and
  z(k+1) represents the target lateral speed.

* * * * *